United States Patent
Park et al.

(10) Patent No.: US 9,294,246 B2
(45) Date of Patent: Mar. 22, 2016

(54) WIRELESS COMMUNICATION DEVICE USING COMMON CONTROL CHANNEL AND WIRELESS COMMUNICATION METHOD USING THE SAME

(71) Applicant: Electronics and Telecommunications Research Institute, Daejeon (KR)

(72) Inventors: Tae Joon Park, Daejeon (KR); Keun Hyung Lee, Daejeon (KR); Yong Sun Kim, Daejeon (KR); Wun-Cheol Jeong, Daejeon (KR); Chang Sub Shin, Daejeon (KR); Juderk Park, Daejeon (KR); Eun-Hee Kim, Daejeon (KR); Hoyong Kang, Daejeon (KR); Cheol Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 67 days.

(21) Appl. No.: 14/217,994

(22) Filed: Mar. 18, 2014

(65) Prior Publication Data

US 2014/0286216 A1    Sep. 25, 2014

(30) Foreign Application Priority Data

Mar. 19, 2013   (KR) .................. 10-2013-0028895
Feb. 14, 2014   (KR) .................. 10-2014-0017507

(51) Int. Cl.
*H04L 5/00*      (2006.01)
*H04W 52/02*    (2009.01)
*H04L 1/00*      (2006.01)
*H04W 48/18*    (2009.01)
*H04B 7/155*    (2006.01)
*H04W 88/04*    (2009.01)

(52) U.S. Cl.
CPC .......... *H04L 5/0053* (2013.01); *H04B 7/15557* (2013.01); *H04L 1/0001* (2013.01); *H04L 5/0058* (2013.01); *H04W 48/18* (2013.01); *H04W 52/0209* (2013.01); *H04W 88/04* (2013.01)

(58) Field of Classification Search
CPC ...................................................... H04L 5/0053
USPC .......... 370/311, 315, 252, 254, 227, 279, 338
See application file for complete search history.

(56) References Cited

U.S. PATENT DOCUMENTS 8,094,577 B2 *   1/2012   Kwon et al. .................. 370/252
8,797,848 B2 *   8/2014   Kwon et al. .................. 370/227

(Continued)

OTHER PUBLICATIONS

Tae-Joon Park et al., "Common discovery mode for PAC," IEEE 802.15 Working Group for Wireless Personal Area Networks (WPANs), Mar. 2013, pp. 1-10, ETRI.

*Primary Examiner* — Parth Patel
(74) *Attorney, Agent, or Firm* — William Park & Associates Ltd.

(57) ABSTRACT

A wireless communication method using a control channel between wireless communication devices including: exchanging profile information between a node and intermediate relay nodes therearound so as to allow the node to transmit/receive data to/from a destination node; determining, by the node, a first intermediate relay node using the profile information and determining a wireless communication mode with the first intermediate relay node; and transmitting/receiving data between the node and the first intermediate relay node by the determined wireless communication mode is provided.

17 Claims, 7 Drawing Sheets

(56) References Cited

U.S. PATENT DOCUMENTS

| | | | |
|---|---|---|---|
| 2008/0075010 A1* | 3/2008 | Song | 370/238 |
| 2008/0242299 A1* | 10/2008 | Edwards et al. | 455/435.2 |
| 2008/0304555 A1* | 12/2008 | Larsson | 375/211 |
| 2009/0115626 A1* | 5/2009 | Vaswani et al. | 340/870.02 |
| 2009/0147763 A1* | 6/2009 | Desai et al. | 370/343 |
| 2009/0290528 A1* | 11/2009 | Kwon et al. | 370/315 |
| 2010/0169691 A1* | 7/2010 | Hwang et al. | 713/340 |
| 2011/0191484 A1* | 8/2011 | Babbar et al. | 709/228 |
| 2011/0211551 A1* | 9/2011 | Parkvall | 370/330 |
| 2011/0231512 A1* | 9/2011 | Sathish et al. | 709/217 |
| 2011/0299412 A1* | 12/2011 | Diab et al. | 370/252 |
| 2012/0084364 A1* | 4/2012 | Sivavakeesar | 709/205 |
| 2012/0300616 A1* | 11/2012 | Zeng et al. | 370/216 |
| 2012/0314609 A1* | 12/2012 | Chang et al. | 370/252 |
| 2013/0028169 A1* | 1/2013 | Bontu et al. | 370/315 |
| 2013/0029589 A1* | 1/2013 | Bontu et al. | 455/7 |
| 2013/0039201 A1* | 2/2013 | Kwon et al. | 370/252 |
| 2013/0039261 A1* | 2/2013 | Bi et al. | 370/315 |
| 2013/0122960 A1* | 5/2013 | Kim et al. | 455/566 |
| 2013/0132008 A1* | 5/2013 | Borean et al. | 702/60 |
| 2013/0273923 A1* | 10/2013 | Li et al. | 455/450 |
| 2013/0315133 A1* | 11/2013 | Wang et al. | 370/315 |
| 2014/0226547 A1* | 8/2014 | Zainaldin | 370/311 |
| 2014/0244747 A1* | 8/2014 | Aggarwal et al. | 709/204 |
| 2014/0269381 A1* | 9/2014 | Lee et al. | 370/252 |

* cited by examiner

WIRELESS COMMUNICATION DEVICE USING COMMON CONTROL CHANNEL AND WIRELESS COMMUNICATION METHOD USING THE SAME

CROSS-REFERENCE TO RELATED APPLICATION

This application claims priority to and the benefit of Korean Patent Application Nos. 10-2013-0028895 and 10-2014-0017507 filed in the Korean Intellectual Property Office on Mar. 19, 2013 and Feb. 14, 2014, the entire contents of which are incorporated herein by reference.

BACKGROUND OF THE INVENTION (a) Field of the Invention

The present invention relates to a wireless communication device using a common control channel and a wireless communication method using the same.

(b) Description of the Related Art

Recently, with the development of wireless communications and the propagation of technologies meeting various requirements, communication devices including at least one of various types of wireless transmission modes have been gradually increased. However, due to characteristics of the communication devices using a battery, it is inefficient to keep the wireless transmission modes in an operation state at all times, and direct communication between the communication devices may be made only by predetermined transmission modes.

Recently, in some of the services which do not use the direct communication, that is, uses backbone network communication, a method of supplementarily using some communication modes, such as Wi-Fi, has been introduced, but a method of performing direct communication between devices is not yet present.

Recently, the importance of communication technologies which may keep a minimum communication function in the situation in which viability is important, such as a disaster, has increased. However, the backbone communication network (3G and 4G), the Wi-Fi, and the like which are currently widely used do not meet requirements such as through limited power, poor channel environment, without an appropriate transmission distance indoors and outdoors, and the like, which are requirements preferentially considering viability.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a wireless communication device and a wireless communication method capable of performing communication by forming a common control channel.

An exemplary embodiment of the present invention provides a wireless communication method using a control channel between wireless communication devices, including: exchanging profile information between a node and intermediate relay nodes therearound through a control channel so as to allow the node to transmit/receive data to/from a destination node; determining, by the node, a first intermediate relay node using the profile information and determining a wireless communication mode with the first intermediate relay node; and transmitting/receiving data between the node and the first intermediate relay node by the determined wireless communication mode.

The determining may include requesting, by the node, the first intermediate relay node to turn on a communication processor corresponding to the wireless communication mode determined through the control channel connected to the first intermediate relay node.

The wireless communication method may further include: selecting, by the node, at least one second intermediate relay node sequentially connected between the first intermediate relay node and the destination node and determining wireless communication modes among the first intermediate relay node, the second intermediate relay node, and the destination node; and when all the connections from the node to the destination node are completed, transmitting data between the node and the destination node via the first intermediate relay node and the second intermediate relay node.

The node, the first intermediate relay node, the second intermediate relay node, or the destination node may include a controller which performs control to support at least one wireless communication mode and dynamically select wireless communication modes performing wireless communication with the surrounding nodes.

The wireless communication mode may include at least one transmission technology of Wi-Fi, Zigbee, Bluetooth, Near Field Communication (NFC), 2G, 3G, and 4G.

The profile information may include at least one of a security method, a wireless communication mode, a power supply state, and a usage of each node.

Another embodiment of the present invention provides a wireless communication method using a control channel between wireless communication devices, including: selecting, by a wireless communication device, at least one intermediate relay node present therearound through a control channel and selecting and connecting wireless communication modes with the selected intermediate relay node; selecting wireless communication modes between the intermediate relay nodes and the destination node in consideration of a communication mode of the destination node and connecting between the intermediate relay node and the destination node by the selected wireless communication mode; and transmitting/receiving, by the wireless communication device, data to/from the wireless communication device of the destination node via the intermediate relay node.

The selecting and connecting the wireless communication modes with the intermediate relay nodes may include: sequentially selecting, by the intermediate relay node connected to the wireless communication device, other intermediate relay nodes present therearound and selecting and connecting the wireless communication modes with the selected other intermediate relay nodes.

The connecting between the intermediate relay node and the destination node may include connecting between the intermediate relay node which is present around the destination node and is finally selected from the other intermediate relay nodes and the destination node.

The selecting and connecting the wireless communication modes with the intermediate relay nodes may include, when it is determined that the data transfer through a backbone network is optimal, connecting the wireless communication device, the intermediate relay node, or the destination node to transfer data via the backbone network.

The connecting between the intermediate relay node and the destination node may include, when no control channel communication function to connect the nodes is present, forming a virtual control channel in the backbone network to connect the nodes.

The backbone network may include any one of a Wi-Fi access point (AP) and a base station which supports 2G, 3G, or 4G mode.

Yet another embodiment of the present invention provides a wireless communication device performing wireless communication using a wireless transmission technology, including: a wireless transmission unit performing wireless communication with a communication device using at least one wireless communication mode; and a controller performing a control which dynamically selects a wireless communication mode performing wireless communication with at least one wireless communication device and performs the wireless communication with the wireless communication device in which a control channel is formed using the selected wireless communication mode.

The controller may include: a channel forming unit forming a channel performing communication with the at least one wireless communication device using the at least one wireless communication mode; a profile storage unit storing profile information; and a selection unit selecting the at least one wireless communication device using the profile information and dynamically selecting the wireless communication mode performing wireless communication with the selected wireless communication device.

The channel forming unit may form separated control channels for each wireless communication mode or form separated control channels for each wireless communication device.

The wireless communication mode may include at least one transmission technology of Wi-Fi, Zigbee, Bluetooth, Near Field Communication (NFC), 2G, 3G, and 4G.

The controller may control the wireless transmission unit to transmit/receive data to/from a destination node via at least one intermediate relay node.

The profile information may include at least one of a security method, a wireless communication mode, a power supply state, and a usage of the node.

The controller may perform control to maintain communication processors of other wireless communication modes other than a communication processor of a wireless communication mode for the control channel be in a disabled state to prevent an unnecessary power waste and if necessary, perform a control to enable the communication processor for a data channel through the control channel having a low power characteristic.

According to the exemplary embodiments of the present invention, it is possible to provide the environment in which a minimum communication path may be maintained in the situation in which viability is required, such as a disaster, by providing the common control channel through which the profile information is exchanged between the communication devices to dynamically select and connect the wireless communication modes.

DETAILED DESCRIPTION OF THE EMBODIMENTS

Figure 1:
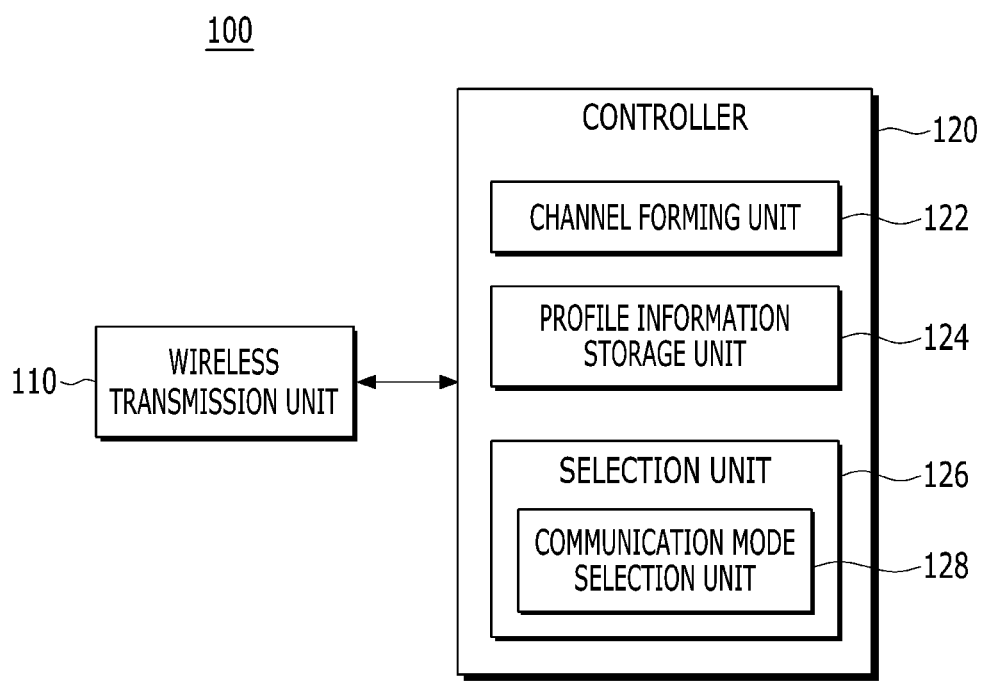
FIG. 1 is a block diagram of a wireless communication device including a controller according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification, unless explicitly described to the contrary, "comprising" any components will be understood to imply the inclusion of other elements rather than the exclusion of any other elements.

In addition, the terms "-er", "-or", and "module" described in the specification mean units for processing at least one function and operation, and can be implemented by hardware components or software components and combinations thereof.

Hereinafter, a wireless communication device using a common control channel and a wireless communication method using the same according to an exemplary embodiment of the present invention will be described in detail with reference to the accompanying drawings.

Recently, with the development of wireless communications and the propagation of technologies meeting various requirements, communication devices including at least one wireless communication mode have gradually increased. At present, however, communication between the communication devices may only be made by one predetermined transmission mode, and it is difficult to perform direct communication between devices which may dynamically select and use an appropriate communication mode.

Further, in the situation in which viability is required, a method of providing a minimum communication function has been required, but the existing wireless communication device mainly aiming at improvement of performance such as transfer speed does not meet requirements, such as through limited power, poor channel environment, and without an appropriate transmission distance indoors and outdoors for viability.

Therefore, a wireless communication devices and a wireless communication method according to an exemplary embodiment of the present invention provide a common control channel for direct communication between the communication devices having at least one wireless communication mode to provide the environment in which a communication mode having high viability in a disaster may be provided.

FIG. 1 is a block diagram of a wireless communication device including a controller according to an exemplary embodiment of the present invention. In this case, for convenience of explanation, a configuration of the wireless communication device according to the exemplary embodiment of the present invention is schematically illustrated, but the wireless communication device is not limited thereto.

Referring to FIG. 1, a wireless communication device 100 according to the exemplary embodiment of the present invention includes terminals or communication devices which may perform wireless transmission and reception through a common control channel and as devices which form a node performing wireless communication between the communication devices, includes a wireless transmitting unit 110 and a controller 120 according to one exemplary embodiment of the present invention.

The wireless transmitting unit 110 performs wireless communication with the communication devices using at least one wireless communication mode. Herein, the wireless communication mode includes at least one transmission technology of Wi-Fi, Zigbee, Bluetooth, Near Field Communication (NFC), 2G, 3G, and 4G.

The controller 120 enables a predetermined wireless communication device for a chair channel, or if the wireless communication device is not determined in advance, selects at least one wireless communication device and dynamically selects the wireless communication mode which performs the wireless communication. Further, the controller 120 forms a control channel between the wireless communication devices. The controller 120 also controls to perform the wireless communication between the wireless communication devices using the selected wireless communication mode.

The controller 120 controls the wireless transmitting unit 110 to transmit and receive data to/from a destination node via at least one intermediate relay node. Here, the intermediate relay node and the destination node include the wireless communication device 100 according to the exemplary embodiment of the present invention.

The controller 120 according to the exemplary embodiment of the present invention also includes a channel forming unit 122, a profile information storage unit 124, and a selection unit 126.

The channel forming unit 122 forms a control channel performing communication using the at least one wireless communication mode. In this case, the channel forming unit 122 may form separated control channels for each wireless communication mode or separated control channels for each wireless communication device. Further, the channel forming unit 122 may form a data channel to transmit/receive data between the wireless communication devices.

Here, the control channel includes a "common line signal type" such as the existing control channel for telecommunication, such as the existing voice telephone network or a mobile telephone network. The control channel is a channel used to operate a network and may transmit user data in a limited range, such as an SMS of a mobile phone, a UUS service of ISND, or an intelligent network service of a voice telephone network. The data channel is a channel through which data are transmitted.

Therefore, the wireless communication device 100 according to the exemplary embodiment of the present invention separately operates the control channel and the data channel to increase reliability and flexibility of network operation.

The profile information storage unit 124 stores profile information. The profile information includes at least one of a security method for the wireless communication device, the wireless communication mode, a power supply state, and a usage of the node.

The selection unit 126 selects the wireless communication device for at least one data channel using the profile information of the wireless communication devices. Further, the selection unit 126 includes a communication mode selection unit 128 which dynamically selects the wireless communication mode performing wireless communication with the wireless communication device selected according to the exemplary embodiment of the present invention.

Hereinafter, an example of a wireless network formed depending on whether the controller according to the exemplary embodiment of the present invention is present will be described in detail with reference to FIGS. 2 and 3.

Figure 2:
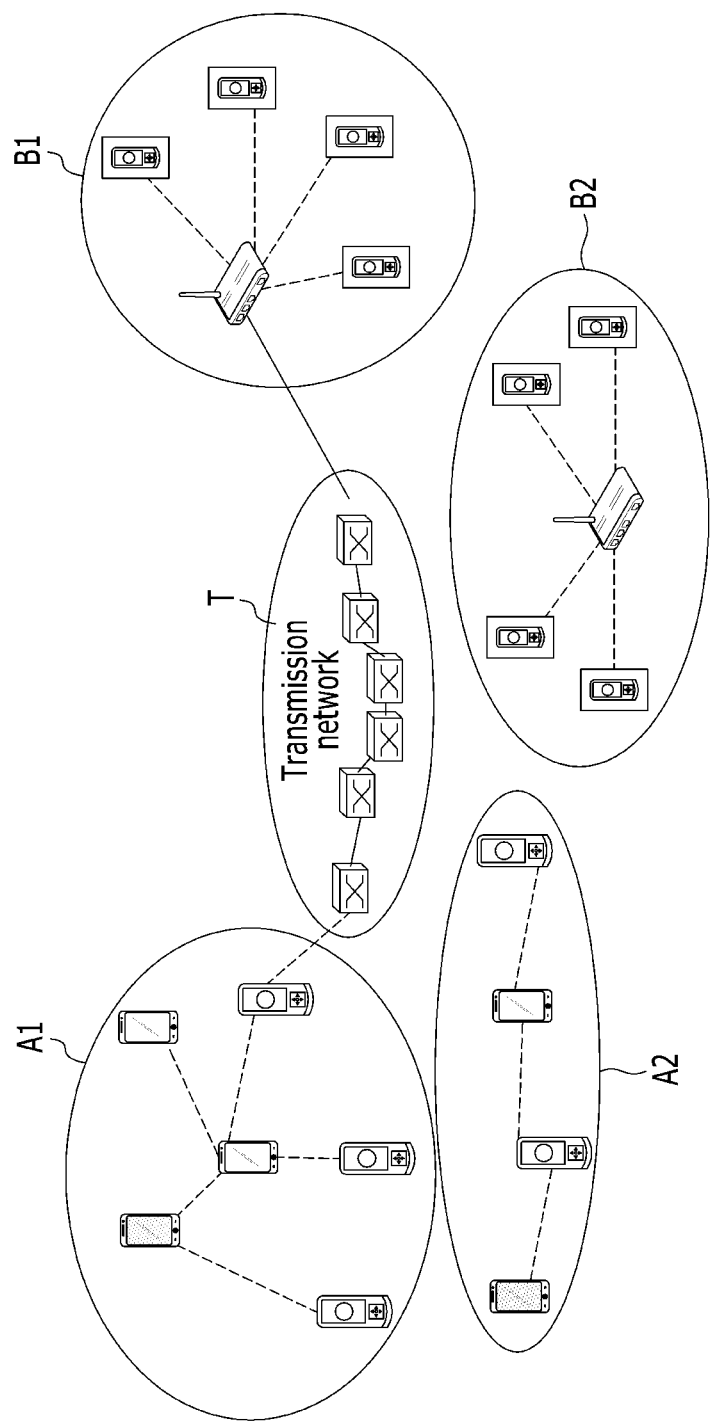
FIG. 2 is a diagram illustrating a case in which the wireless communication device without a controller and the wireless communication device with the controller coexist.

First, FIG. 2 is a diagram illustrating a case in which the wireless communication device without a controller and the wireless communication device with the controller are present together.

Referring to FIG. 2, in the beginning of service diffusion according to the exemplary embodiment of the present invention, a device with the controller and a device without the controller coexist, in which networks A1 and A2 are configured of the wireless communication devices with the controller and networks B1 and B2 are configured of the wireless communication devices without the controller.

In this case, the networks A1 and A2 configured of the wireless communication devices with the controller provide connectivity through the control channel. However, the networks B1 and B2 configured of the wireless communication devices without the controller may not use the control channel due to the absence of the controller, and therefore a control function is performed by an AP which serves as the controller or a backbone network which includes a base station 200 to provide the connectivity.

Further, the network A1 configured of the wireless communication devices with the controller and the network B1 configured of the wireless communication devices without the controller are connected to a common transfer network T to provide a wide area service. Unlike this, in the case in which the networks A1 and B1 may not be connected to the transfer network or need not be connected to the transfer network, the networks A2 and B2 may be configured independently.

Figure 3:
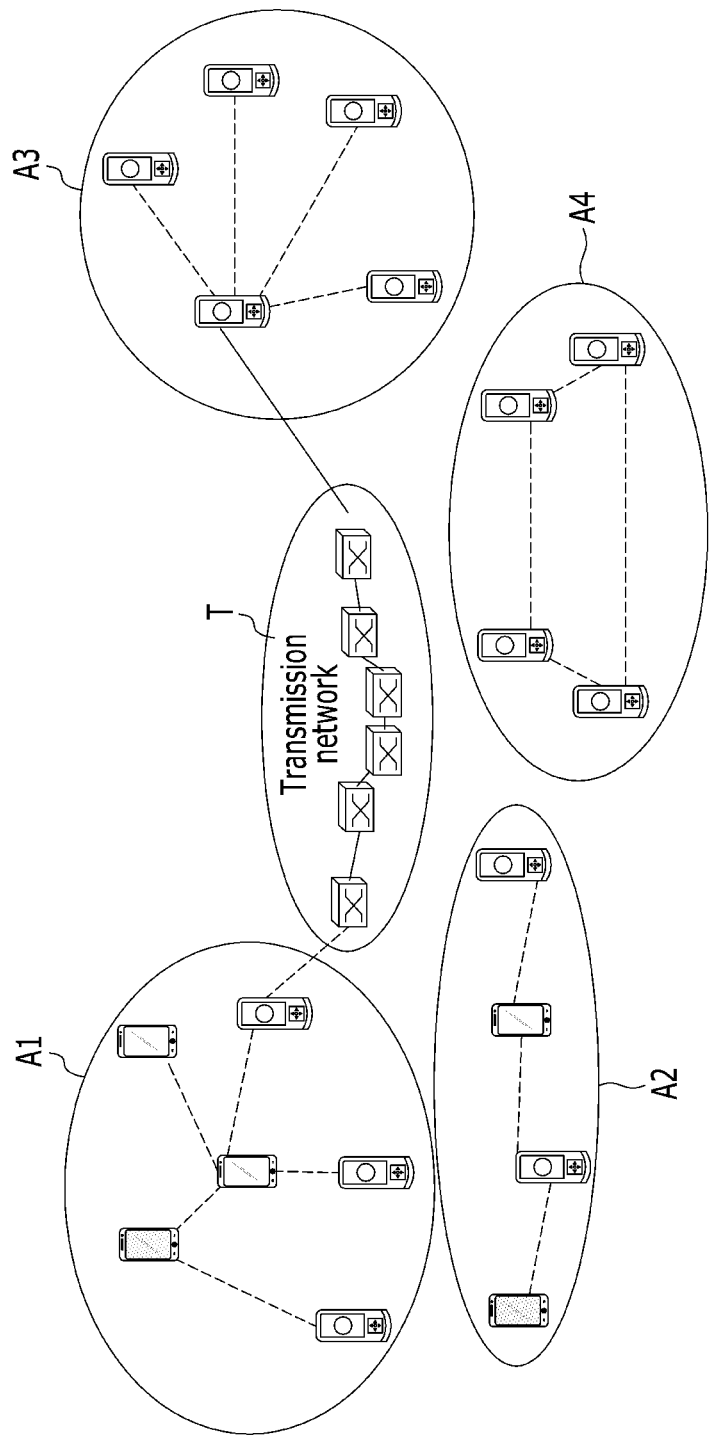
FIG. 3 is a diagram illustrating the case in which the wireless communication device includes the controller.

FIG. 3 is a diagram illustrating the case which the wireless communication device includes the controller.

Referring to FIG. 3, all the networks A1, A2, A3, and A4 are configured of the wireless communication apparatuses with the controller, in which the control channel controls all the resources. Further, some (A1 and A3) of the networks A1, A2, A3, and A4 are connected to the common transfer network T to provide the wire area service, and when some (A2 and A4) of the networks A1, A2, A3, and A4 may not be connected to the transfer network or need not be connected to the transfer network, the networks A2 and A4 configure independent networks.

Hereinafter, according to the exemplary embodiment of the present invention, a process of selecting an intermediate relay node and the wireless communication mode and transmitting/receiving data using the backbone network will be described in detail with reference to FIGS. 4 and 5.

Figure 4:
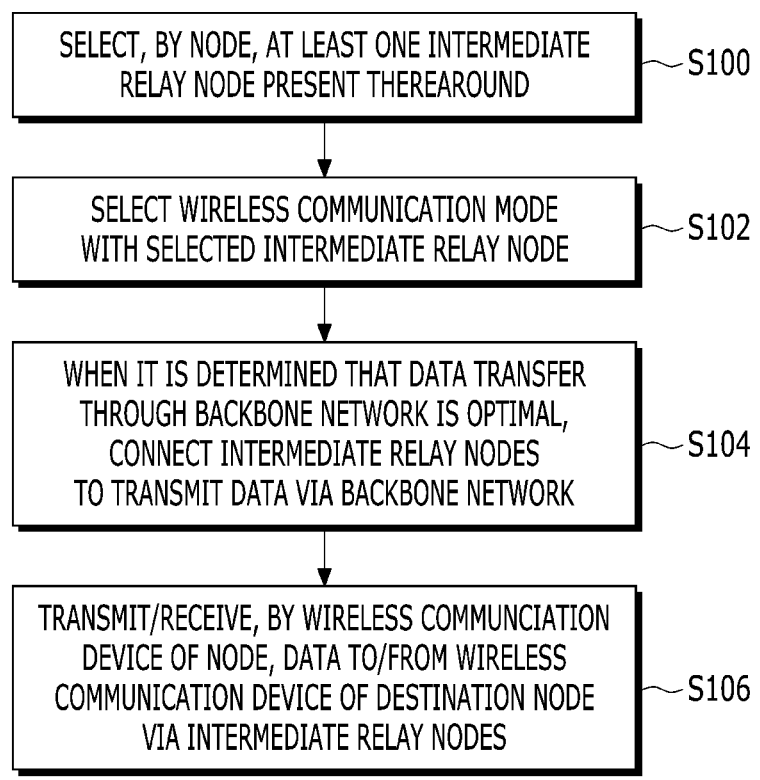
FIG. 4 is a flowchart illustrating a wireless communication method according to an exemplary embodiment of the present invention.

FIG. 4 is a flowchart illustrating a wireless communication method according to an exemplary embodiment of the present invention. In this case, the following flowchart will be described by using the same reference numerals which are attached to components of FIG. 1.

Referring to FIG. 4, according to the exemplary embodiment of the present invention, the node configured of the wireless communication device including the controller selects at least one intermediate relay node which is present therearound.

Further, the node selects the wireless communication mode with the intermediate relay nodes using the controller (S102).

In this case, if it is determined that the data transfer through a separate backbone network is optimal, the nodes connect the intermediate relay nodes to each other to transfer data via the backbone network.

Next, the wireless communication device of the node transmits/receives data to/from the wireless communication device of a destination node via the intermediate relay nodes (S106).

Figure 5:
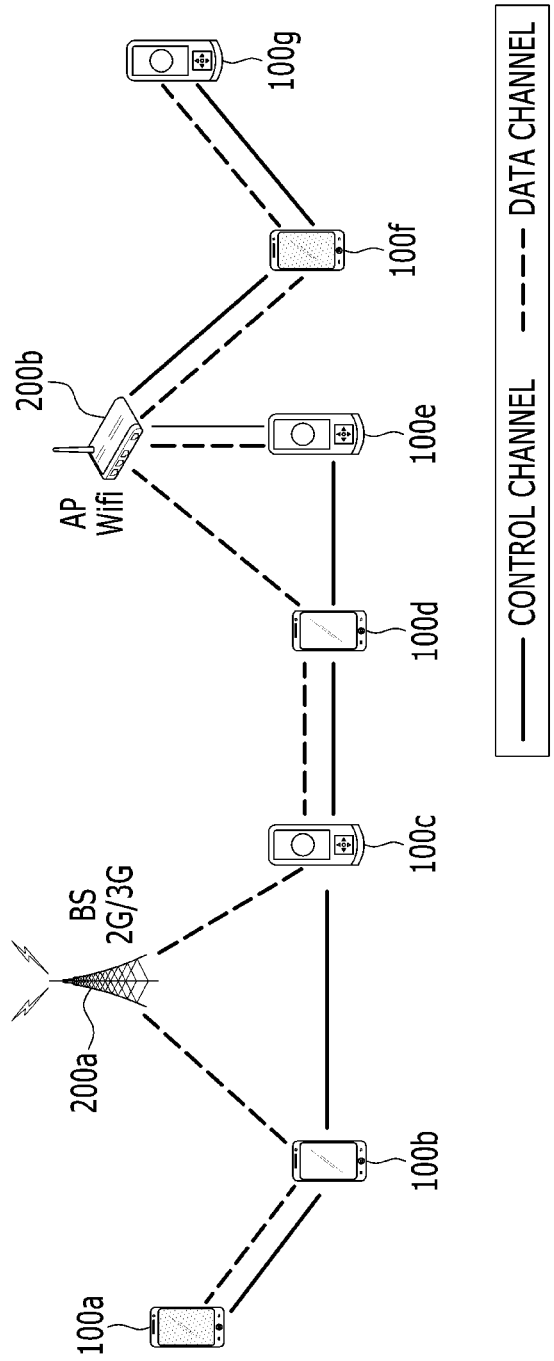
FIG. 5 is a diagram illustrating an example in which a communication connection between devices is made by the controller according to the exemplary embodiment of the present invention.

FIG. 5 is a diagram illustrating an example in which a communication connection between devices is made by the controller according to the exemplary embodiment of the present invention.

FIG. 5 illustrates an example in which seven communication devices 100a to 100g, a base station 200a of one backbone communication network, and a Wi-Fi AP 200B are configured so that a specific node 100a communicates with a destination node 100g.

In this case, the nodes 100a to 100f form intermediate relay nodes. Further, each node is not limited to types of backbone communication technologies such as 2G and 3G, and technologies such as Wi-Fi, Zigbee, Bluetooth, and the like, but means a device having at least one communication function, and is not limited to a device such as a user terminal and a server.

Describing this in detail, the node 100a and the node 100b are connected to each other by a typical one-to-one communication type, and an optimal technology is applied in consideration of communication technologies and resources which may be available in the two nodes.

Further, it is determined to be optimal that a direct control channel is available between the node 100b and the node 100c, but the user data are transferred through the backbone network. In this case, the user data are transferred via the base station 200a of the backbone network through the data channel. Further, as in the node 100a and the node 100b, the node 100c and the node 100d are directly connected to each other.

It is determined to be optimal that the direct control is available between the node 100d and the node 100e, but the user data are transferred through a third device such as the AP 200b. Therefore, the user data are transferred via the Wi-Fi AP 200b.

In case the direct control channel is not available between the node 100e and the node 100f, the control channel is connected through the third device such as the Wi-Fi AP 200b and then communicates along an optical path, and the user data are transferred via the Wi-Fi AP 200b. In this case, when the control channel communication function is not present in the Wi-Fi AP 200b, the control channel function is performed using the virtual control channel between the node 100e and the node 100f. Further, as in the node 100a and the node 100b, the node 100f and the node 100g are directly connected to each other.

Therefore, the node 100a may communicate with the destination node 100g via the intermediate relay nodes 100b to 100f, the base station 200a of the backbone network, and the Wi-Fi AP 200b.

Hereinafter, a process of determining intermediate relay nodes and wireless communication modes using profile information according to another exemplary embodiment of the present invention will be described in detail with reference to FIGS. 6 and 7.

Figure 6:
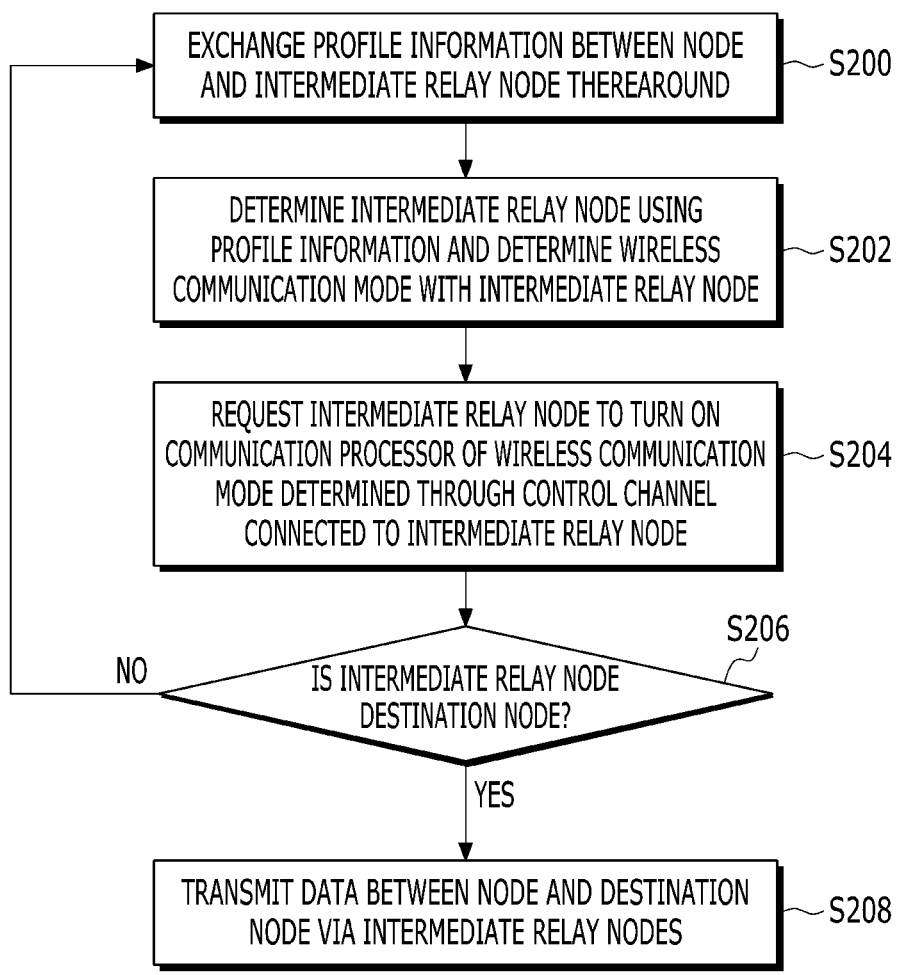
FIG. 6 is a flowchart illustrating a wireless communication method according to another exemplary embodiment of the present invention.

FIG. 6 is a flowchart illustrating a wireless communication method according to another exemplary embodiment of the present invention. In this case, the following flowchart will be described by using the same reference numerals which are attached to components of FIG. 1.

Referring to FIG. 6, the profile information is exchanged between the node and the intermediate relay node therearound (S200). The profile information includes at least one of a security method for the wireless communication device, the wireless communication mode, a power supply state, and a usage of the node.

Further, the node determines the intermediate relay node using the profile information, determines the wireless communication mode with the intermediate relay node, and requests the intermediate relay node to turn on a communication processor of the wireless communication mode determined through a control channel connected to the intermediate relay node (S202 and S204).

In this case, when the intermediate relay node is not the destination node, the processes S200 to S204 are repeated, and when the intermediate relay node is the destination node, the connections are completed (S206).

Further, the node and the destination node transfers data via the intermediate relay nodes (S208). In this case, the wireless communication method according to the exemplary embodiment of the present invention may transfer data to each link when the intermediate relay nodes are connected before all connections are completed.

Figure 7:
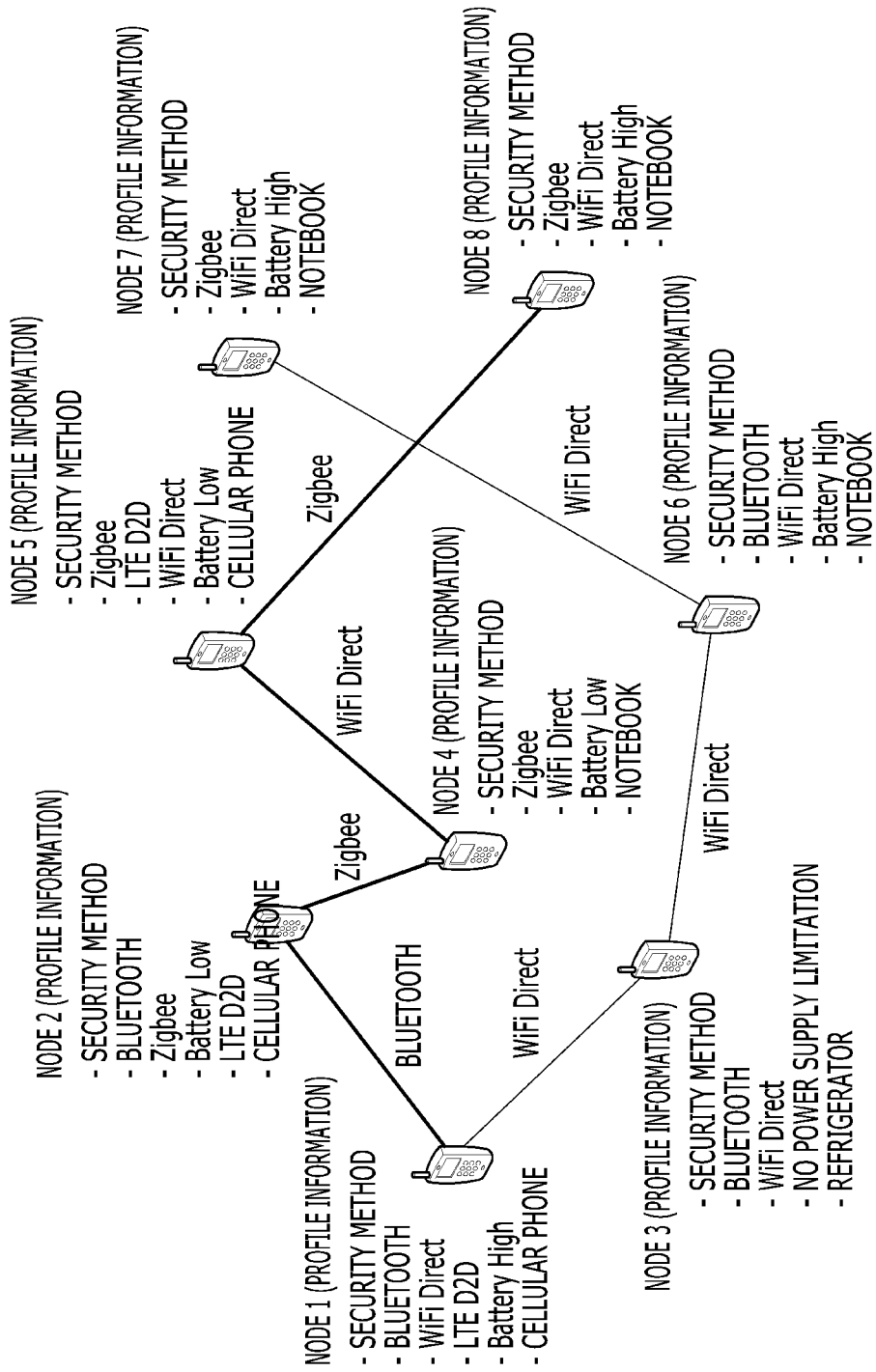
FIG. 7 is a diagram illustrating an example in which a communication connection between devices is made by changing a dynamic communication mode between devices by a controller according to another exemplary embodiment of the present invention.

FIG. 7 is a diagram illustrating an example in which a communication connection between devices is made by changing a dynamic communication mode between devices by a controller according to another exemplary embodiment of the present invention.

Referring to FIG. 7, each of the wireless communication devices exchanges its own profile information through the control channel. In this case, the profile information includes a security method, the wireless communication modes (Bluetooth, Wi-Fi direct), LTE D2D, a power supply state, a usage (cellular phone, refrigerator, notebook), and the like.

A first connection from node 1 to node 7 shows a connection route through which applications having a high transmission rate are served.

First, node 1 is a communication processor for direct communication and supports the Bluetooth, the Wi-Fi direct, and the LTE D2D, but node 2 supports only the Bluetooth and the Zigbee. Further, node 3 does not have the Bluetooth, the Wi-Fi direct, or a power supply limitation. Node 1, node 2, and node 3 know their own profiles through the control channel.

Next, node 1 predicts that the transmission rate required in the applications is high and a lot of power is used and thus is determined to communicate with node 3 by the Wi-Fi direct, and performs a request to turn on the Wi-Fi direct module of node 3 through the control channel. In this case, the nodes may allow an MCU to perform decision-making based on the information through the control channel and then enable the communication processor. Therefore, when the node 3 turns on the Wi-Fi direct module, node 1 and node 3 transmit and receive data to/from each other by the Wi-Fi direct.

Further, node 1 selects the intermediate relay nodes node 3 and node 6 to be connected to node 7, and selects the communication mode of the selected intermediate relay node and the like. First, after all the connections are completed, data may be transferred, and after the links are determined, data may also be transferred to each link.

Further, a second route from node 1 to node 8 shows that the intermediate nodes node 2, node 4, and node 5 are connected to each other through the control channel to allow node 1 to transfer data to node 8.

As described above, the wireless communication device and the wireless communication method according to the exemplary embodiment of the present invention provide the common control channel for communication between the communication devices having at least one wireless communication mode and provide the communication channel which may keep the minimum communication function for viability in the emergency situation.

For the direct communication between the current communication devices, the communication may be made only by the one predetermined transmission mode. Therefore, the appropriate communication modes for each link need to be selected so that the devices with various communication processors are connected to each other in a multihop to communicate with the destination devices. Further, when only the minimum communication functions are required in the emergency rescue situation, the communication channel in a standby state for a long period of time with minimum power is required. The existing Wi-Fi direct and Bluetooth consume a lot of power while they are in the standby state at all times, and therefore may not be in a turn-on state for a long period of time.

Therefore, according to the exemplary embodiment of the present invention, the minimum connectivity between the devices for user service even in the situation in which viability is threatened, such as the disaster management, is secured and the optimal connectivity between the communication processors is provided using the separated control channel.

Further, according to the exemplary embodiment of the present invention, the communication may be made with low power and it is possible to efficiently share the information between the devices about the situation in which viability is threatened, such as the disaster management and the information requiring the low transmission speed. Further, the optimal communication mode for user service is selected from one or more communication modes such as Wi-Fi, Zigbee, Bluetooth, Near Field Communication (NFC), 3G, and 4G by performing the control functions which are embedded in the terminal performing the wireless transmission/reception and physically separated from each other, thereby performing the communication between the terminals. In this case, when the communication functions required in the terminal is turned off, the communication may be made by enabling the required functions.

That is, the wireless communication device and the wireless communication method according to the exemplary embodiment of the present invention provide the communication modes keeping the minimum robust communication path for applications required for viability in the situation in which the available resources are limited, such as the disaster management, and provides the common control channel to the communication devices having at least one wireless communication transmission mode.

Herein, the control channel needs to secure higher reliability and viability than the channel to which the user information is transferred, so the communication devices rather than the control device prevent the unnecessary power waste and thus are enabled only when receiving the communication request through the control channel in the state in which the communication devices are kept in the disable state, and provide the environment in which the control device may be operated with low power.

The foregoing exemplary embodiments of the present invention are not implemented only by an apparatus and a method, and therefore may be realized by programs realizing functions corresponding to the configuration of the exemplary embodiment of the present invention or recording media on which the programs are recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A wireless communication method using a control channel between wireless communication devices, comprising:
   exchanging profile information between a mobile node and intermediate mobile relay nodes therearound through a control channel so as to allow the mobile node to transmit/receive data to/from a mobile destination node;
   determining, by the mobile node, a first intermediate mobile relay node using the profile information and determining a wireless communication mode with the first intermediate mobile relay node; and
   transmitting/receiving data between the mobile node and the first intermediate mobile relay node by the determined wireless communication mode,
   wherein the mobile node, the intermediate mobile relay nodes, or the mobile destination node includes
   a controller which performs control to support at least two wireless communication mode and dynamically select the wireless communication modes performing wireless communication with the surrounding mobile nodes,
   wherein the controller forms separated control channels for each wireless communication mode or forms separated control channels for each mobile wireless communication device, and separately operates the control channel and a data channel.

2. The wireless communication method of claim 1, wherein the determining includes requesting, by the mobile node, the first intermediate mobile relay node to turn on a communication processor corresponding to the wireless communication mode determined through the control channel connected to the first intermediate mobile relay node.

3. The wireless communication method of claim 1, further comprising:
   selecting, by the mobile node, at least one second intermediate mobile relay node sequentially connected between the first intermediate mobile relay node and the mobile destination node and determining wireless communication modes among the first intermediate mobile relay node, the second intermediate mobile relay node, and the destination node; and
   when all the connections from the mobile node to the mobile destination node are completed, transmitting data between the mobile node and the mobile destination node via the first intermediate mobile relay node and the second intermediate mobile relay node.

4. The wireless communication method of claim 3, wherein the wireless communication mode includes at least one transmission technology of Wi-Fi, Zigbee, Bluetooth, Near Field Communication (NFC), 2G, 3G, and 4G.

5. The wireless communication method of claim 4, wherein the profile information includes at least one of a security method, a wireless communication mode, a power supply state, and a usage of each mobile node.

6. A wireless communication method using a control channel between wireless communication devices, comprising:
    selecting, by a wireless communication device, at least one intermediate mobile relay node present therearound through a control channel and selecting and connecting wireless communication modes with the selected intermediate mobile relay node;
    selecting wireless communication modes between the intermediate mobile relay nodes and a mobile destination node in consideration of a communication mode of the mobile destination node and connecting between the intermediate mobile relay node and the mobile destination node by the selected wireless communication mode; and
    transmitting/receiving, by the wireless communication device, data to/from the wireless communication device of the mobile destination node via the intermediate mobile relay node,
    wherein the wireless communication device, the intermediate mobile relay nodes or the mobile destination node includes
    a controller which performs control to support at least two wireless communication mode and dynamically select the wireless communication modes performing wireless communication with the surrounding mobile nodes,
    wherein the controller forms separated control channels for each wireless communication mode or forms separated control channels for each mobile wireless communication device, and separately operates the control channel and a data channel.

7. The wireless communication method of claim 6, wherein the selecting and connecting the wireless communication modes with the intermediate mobile relay nodes includes sequentially selecting, by the intermediate mobile relay node connected to the wireless communication device, other intermediate mobile relay nodes present therearound, and selecting and connecting the wireless communication modes with the selected other intermediate mobile relay nodes.

8. The wireless communication method of claim 7, wherein the connecting between the intermediate mobile relay node and the mobile destination node includes connecting between the intermediate mobile relay node which is present around the mobile destination node and is finally selected from the other intermediate mobile relay nodes and the destination node.

9. The wireless communication method of claim 8, wherein the selecting and connecting the wireless communication modes with the intermediate mobile relay nodes includes, when it is determined that the data transfer through a backbone network is optimal, connecting the wireless communication device, the intermediate mobile relay node, or the mobile destination node to transfer data via the backbone network.

10. The wireless communication method of claim 9, wherein the connecting between the intermediate mobile relay node and the mobile destination includes, when no control channel communication function to connect the mobile nodes is present, forming a virtual control channel in the backbone network to connect the mobile nodes.

11. The wireless communication method of claim 10, wherein the backbone network includes any one of a Wi-Fi access point (AP) and a base station which supports 2G, 3G, or 4G mode.

12. A wireless communication device performing wireless communication using a wireless transmission technology, comprising:
    a mobile wireless transmission unit performing wireless communication with a mobile communication device using at least two wireless communication mode; and
    a controller performing a control which dynamically selects a wireless communication mode performing wireless communication with at least one mobile wireless communication device and performs the wireless communication with the mobile wireless communication device in which a control channel is formed using the selected wireless communication mode,
    wherein the controller forms separated control channels for each wireless communication mode or forms separated control channels for each mobile wireless communication device, and separately operates the control channel and a data channel.

13. The wireless communication device of claim 12, wherein the controller includes:
    a channel forming unit forming a channel performing wireless communication with the at least one mobile wireless communication device using the at least two wireless communication mode;
    a profile storage unit storing profile information; and
    a selection unit selecting the at least one mobile wireless communication device using the profile information and dynamically selecting the wireless communication mode performing wireless communication with the selected mobile wireless communication device.

14. The wireless communication device of claim 13, wherein the wireless communication mode includes at least one transmission technology of Wi-Fi, Zigbee, Bluetooth, Near Field Communication (NFC), 2G, 3G, and 4G.

15. The wireless communication device of claim 14, wherein the controller controls the mobile wireless transmission unit to transmit/receive data to/from a mobile destination node via at least one intermediate mobile relay node.

16. The wireless communication device of claim 15, wherein the profile information includes at least one of a security method, a wireless communication mode, a power supply state, and a usage of the mobile node.

17. The wireless communication device of claim 12, wherein the controller performs control to maintain a communication processor of other wireless communication modes other than a communication processor of a wireless communication mode for the control channel be in a disable state to prevent unnecessary power waste, and if necessary, performs control to enable the communication processor for a data channel through the control channel having a low power characteristic.

* * * * *